(12) United States Patent
Kroessmann

(10) Patent No.: US 7,832,544 B2
(45) Date of Patent: Nov. 16, 2010

(54) BATCH TRANSPORT OF ROD-SHAPED ARTICLES FOR THE TOBACCO-PROCESSING INDUSTRY

(75) Inventor: Jürgen Kroessmann, Schwarzenbek (DE)

(73) Assignee: Hauni Maschinenbau AG, Hamburg (DE)

( * ) Notice: Subject to any disclaimer, the term of this patent is extended or adjusted under 35 U.S.C. 154(b) by 204 days.

(21) Appl. No.: 12/115,860

(22) Filed: May 6, 2008

(65) Prior Publication Data
US 2008/0286078 A1 Nov. 20, 2008

(30) Foreign Application Priority Data
May 9, 2007 (DE) .................. 10 2007 022 235

(51) Int. Cl.
*B65G 47/26* (2006.01)
(52) U.S. Cl. .................... 198/442; 193/23; 193/29
(58) Field of Classification Search ........... 198/442, 198/359, 370.01, 370.1, 436; 193/23, 29
See application file for complete search history.

(56) References Cited

U.S. PATENT DOCUMENTS

| 3,080,033 | A | * | 3/1963 | Graeme et al. ............. 193/23 |
| 3,193,078 | A | * | 7/1965 | Amenta et al. ............ 198/419.1 |
| 3,580,640 | A | * | 5/1971 | Eriksson .................... 198/442 |
| 4,144,965 | A | * | 3/1979 | Alldredge et al. .......... 198/838 |
| 4,258,850 | A | * | 3/1981 | Solaroli ..................... 193/23 |
| 4,723,649 | A | * | 2/1988 | Hartness et al. ............ 198/442 |
| 5,944,165 | A |   | 8/1999 | Mannlein et al. |
| 6,220,427 | B1 | * | 4/2001 | Ratz et al. ................ 198/442 |
| 6,290,055 | B1 |   | 9/2001 | Glorfield |
| 6,540,061 | B1 |   | 4/2003 | Focke et al. |
| 2005/0011728 | A1 | * | 1/2005 | Ledingham ................. 198/453 |

FOREIGN PATENT DOCUMENTS

| DE | 1 532 208 | 1/1970 |
| DE | 25 46 599 | 4/1976 |
| DE | 32 23 070 | 1/1983 |
| DE | 33 35 955 | 4/1984 |
| DE | 37 42 093 | 6/1988 |
| DE | 20 2004 020 828 | 3/2006 |
| DE | 10 2005 018 302 | 10/2006 |
| DE | 10 2006 014 182 | 9/2007 |
| EP | 1 020 126 | 7/2000 |
| EP | 1 321 393 | 6/2003 |
| EP | 1 439 140 | 7/2004 |
| EP | 1 712 141 | 10/2006 |
| GB | 2199008 | 6/1988 |
| WO | 03/053178 | 7/2003 |
| WO | 2004/041683 | 5/2004 |
| WO | 2004/089122 | 10/2004 |

* cited by examiner

*Primary Examiner*—James R Bidwell
(74) *Attorney, Agent, or Firm*—Greenblum & Bernstein P.L.C.

(57) ABSTRACT

The invention relates to an apparatus structured and arranged to transport rod-shaped articles of the tobacco-processing industry in a mass flow between an outlet of a first machine and inlets of a plurality of second machines. The apparatus includes guide rails having an inlet side in fixed relation to the outlet of the first machine and a moveable outlet side.

19 Claims, 3 Drawing Sheets

BATCH TRANSPORT OF ROD-SHAPED ARTICLES FOR THE TOBACCO-PROCESSING INDUSTRY

CROSS-REFERENCE TO RELATED APPLICATIONS

The present application claims priority under 35 U.S.C. §119 of German Patent Application No. 10 2007 022 235.3, filed on May 9, 2007, the disclosure of which is expressly incorporated by reference herein in its entirety.

BACKGROUND OF THE INVENTION

1. Field of the Invention

The invention relates to a device for the transport of rod-shaped articles for the tobacco processing industry in a mass flow between machines of the tobacco-processing industry along a conveyor route between an outlet of a first machine (e.g., a production machine) to an inlet of a second machine (e.g., a packaging machine).

2. Discussion of Background Information

International Publication No. WO-A-03/053178 describes a device for connecting a supply unit with a consumer unit for the production of tobacco products. A transport channel is cleared between a production unit (e.g., maker) and a packaging unit (e.g., packer) with a carriage running in the channel.

Furthermore, German Pat. No. DE-A-37 42 093 describes a device for transferring products of the tobacco-processing industry between machines on a production line.

Moreover, European Pat. No. EP-A-1 020 126 describes a method and an apparatus for conveying cigarettes.

In order to prevent a product mixture in a transport channel (for example, in the case of a cigarette brand change), the transport channel on the transport route of rod-shaped articles of the tobacco-processing industry is run empty in an infeed and transfer device (e.g., a Rod Transfer System (RTS)) and a downstream reservoir (e.g., a Flexible Mass Flow Reservoir (FMR)). This obtains a separation between different lots, batches and/or infeeds with rod-shaped articles from the tobacco-processing industry.

SUMMARY OF THE INVENTION

Embodiments of the present invention provide, in a simple manner, a deflection of the mass flow of the mass transport of rod-shaped articles in batches or the like, in particular in a conveyor level. The diversion of the mass flow takes place in a manner that is gentle on the products.

According to aspects of the invention, there is a device for the transport of rod-shaped articles of the tobacco-processing industry in a mass flow between machines of the tobacco-processing industry along a conveyor route between an outlet of a first machine to an inlet of a second machine. The first machine may be, for example, a production machine, while the second machine may be, for example, a packaging machine. An adjustable branching unit is provided along the conveyor route so that, depending on the position of the branching unit, a mass flow is conveyed either to the inlet of the second machine or to the inlet of another device of the tobacco-processing industry. With respect to the conveyor direction of the mass flow behind the outlet of the first machine, lateral and moveable, in particular flexible, guide rails are provided for the conveyor route of the mass flow. The guide rails are arranged at a predetermined distance from each other and spacers are provided between the guide rails transverse to the conveyor direction of the mass flow at a predetermined distance from each other. The guide rails are designed in a fixed manner on their inlet side and are moveable on their outlet side. The guide rails, depending on a predetermined operating type of the device, can be moved by a drive on the outlet side to the inlet of the second machine or the inlet of another device.

In implementations of the invention, the device includes guide rails after or behind the outlet of a first machine of the tobacco-processing industry in the conveyor route of the article mass flow, e.g. of completed cigarettes, in a conveyor section in front of the inlet of a second machine or another down-stream device. The guide rails are designed in a bendable or flexible manner, so that the guide rails can be pivoted in a predetermined angle area. When the guide rails in the guide section are slightly bent, the curve radius of the guide rails is very large due to the curve of the guide rails. Accordingly, a gentle diversion of the mass flow is achieved in a simple manner.

In accordance with further aspects of the invention, the mass flow of the articles is deflected by a small angle with respect to the original conveyor direction, i.e., transverse to the original conveyor direction upon entrance of the mass flow into the conveyor section with the guide rails. In particular, the angle of the conveyor direction during the straight-line entrance of the mass flow into the conveyor section with the lateral guide rails with respect to the conveyor direction at the outlet of the conveyor section on the later guide rails forms an acute angle α, where 0°≦α<90°.

In embodiments of the invention, spacers are provided between the guide rails. The spacers hold the guide rails at a distance from one another during bending of the rails and diversion of the mass flow of the rod-shaped articles. Transverse spacing between the guide rails is held almost constant. This is also achieved through the slight redirection of the guide rails. In this manner, the throughput rate or the even conveyance of the mass flow (or the article batches) is achieved through the conveyor section with the guide rails.

Accordingly, in implementations of the invention, the mass flow of the articles is gentle on the products, i.e., the articles of the mass flow at or during the diversion are not (or are only slightly) stressed mechanically. In contrast, conventional T-shaped branches hand off a mass flow, e.g., to lower-lying mass flow, diverting individual products of the mass two times by 90°. Through this manner of diversions, in T-shaped branches the mechanically sensitive products (e.g., filter cigarettes) are not protected and are thus heavily stressed from a mechanical point of view.

In further embodiments of the invention, a sensor device is provided on the inlet side of the guide rails, through which it is determined whether the conveyor route and the conveyor section with the lateral guide rails are filled with an article mass flow. The sensor device can be designed such that a channel clearing device (such as, for example, that described in European Patent Application EP-A-1 712 141) is detected. The channel clearing device separates an article batch from another mass flow in a transport channel for a mass flow, or clears the corresponding conveyor section during conveyance of the channel clearing device from previously conveyed rod-shaped articles. By detecting the channel clearing device with the sensor device during conveyance of the channel clearing device by the conveyor section, the rod-shaped articles are removed from the conveyor section between the inlet side of the guide rail and the outlet side of the guide rail. Accordingly, in a subsequent operating step, the operating type of the unit is changed and the outlet side of the conveyor section with the guide rails is assigned or moved to another inlet. This results in a safe operation of the transport device, according to aspects of the invention, in the area of the guide rails between the inlet side and the outlet side. In even further embodiments, the sensor device captures holes in the article batch or in the article mass flow.

According to further aspects of the invention, each of spacers between the guide rails are permanently attached to one side of the guide rails. As such, the bendable guide rails are always held at a predetermined distance by the spacers arranged in between, even during corresponding bending of the rails. The guide cross-section between the inlet side on the guide rails and the outlet side on the guide rails remains mainly unchanged or is only slightly changed, such that a gentle guide and simultaneous diversion of the articles of the mass flow is achieved. In particular, the spacers are each permanently attached on one side of the guide rail, while the spacers are not connected with the other guide rail on the opposite-lying side on the spacers. Moreover, the width of the spacers is smaller than the distance between the parallel guide rails, i.e., during positioning of the guide rails in which no diversion of the mass flow takes place such that the mass flow is guided through the conveyor section between the guide rails without a direction change.

In embodiments, in order to achieve a safe transfer from the outlet of the first machine to the inlet of the second machine or to another device, at least one conveyor device is provided in the conveyor section between the inlet side of the guide rails and the outlet side of the guide rails. The at least one conveyor device may be a chain conveyor, preferably having a drive. The conveyor belt is designed in a flexible manner so that the bending of the guide rails at the diversion of a mass flow is moved synchronously with the conveyor direction or the chain conveyor.

In further embodiments, in order to achieve a safe transfer of the articles of the mass flow between the inlet side and the outlet side of the guide rails, a drive is also provided for the conveyor device. When the drive is arranged on the outlet side of the guide rails, a space-saving design of the drive on the guide rails is possible.

In accordance with an even further embodiment, a guide support is provided on the outlet side of the guide rails so that the outlet side of the guide rails is moved or guided with respect to the conveyor direction transverse to the conveyor direction of the mass flow.

In implementations of the invention, the guide rails are moveable or bendable such that, by way of the guide rails, the mass flow is deflected with respect to the inlet-side or outlet-side conveyor direction on the guide rails at an angle between 0° and 45°, preferably between 0° and 30°. A particularly gentle diversion of the articles of the mass flow between the inlet and the outlet side of the guide rails is thereby achieved.

According to aspects of the invention, the conveyance of the mass flow in the area of the rails is executed or takes place in a plane, preferably a horizontal plane.

According to additional aspects of the invention, the change in the delivery of the guide rails to another inlet on the outlet side of the guide rails is executed without the presence of rod-shaped articles between the inlet side and the outlet side of the guide rails.

In a first aspect of the invention, there is an apparatus structured and arranged to transport rod-shaped articles of the tobacco-processing industry in a mass flow between an outlet of a first machine and inlets of a plurality of second machines. The apparatus includes guide rails having an inlet side in fixed relation to the outlet of the first machine and a moveable outlet side.

Spacers may be provided between the guide rails. The spacers are arranged transverse to a direction of the mass flow at a predetermined distance from each other, and maintain a predetermined distance between the guide rails. Moreover, the spacers are fixed to only one of the guide rails.

The first machine may comprise a production machine. The plurality of second machines may comprises at least one of a packaging machine, a collection machine, and a collection container. Also, the guide rails form an adjustable branching unit along a conveyor route of the mass flow. The conveyor route extends between the outlet of the first machine and, depending upon a position of the guide rails, one of the inlets of the plurality of second machines. Additionally, the guide rails are arranged laterally of the conveyor route of the mass flow.

The apparatus may further comprise a drive at the outlet side structured and arranged to bend the guide rails into alignment with one of the inlets of the plurality of second machines, Additionally or alternatively, the apparatus may further comprise a sensor unit at the inlet side.

Furthermore, the apparatus may comprise at least one conveyor device in a conveyor section between the inlet side and the outlet side of the guide rails. The at least one conveyor device may comprise a chain conveyor. A drive device that drives the at least one conveyor device may be provided. The drive device may be at the outlet side of the guide rails.

The apparatus may also include a guide support at the outlet side of the guide rails. The guide support guides movement of the outlet side of the guide rails transverse to a direction of the mass flow.

Additionally, the outlet side of the guide rails is deflectable at an angle between 0° and 45°, preferably at an angle between 0° and 30°, with respect to a direction of the mass flow at the inlet side of the guide rails.

In embodiments, a conveyance of the mass flow in an area of the guide rails takes place in a plane. The plane is preferably a horizontal plane.

In further embodiments, the outlet side of the guide rails is moved from a first one of the inlets of the plurality of second machines to a second one of the inlets of the plurality of second machines without the rod-shaped articles between the guide rails.

According to a second aspect of the invention, there is a method for transporting rod-shaped articles of the tobacco-processing industry in a mass flow from an outlet of an upstream machine. The method comprises diverting the mass flow by bending guide rails from a first position aligned with a first inlet of a first downstream machine to a second position aligned with a second inlet of a second downstream machine.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1d shows a side view of the outlet of the first machine of FIG. 1a.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the following figures, the same or similar types of elements or corresponding parts are provided with the same reference numbers.

Figure 1D:
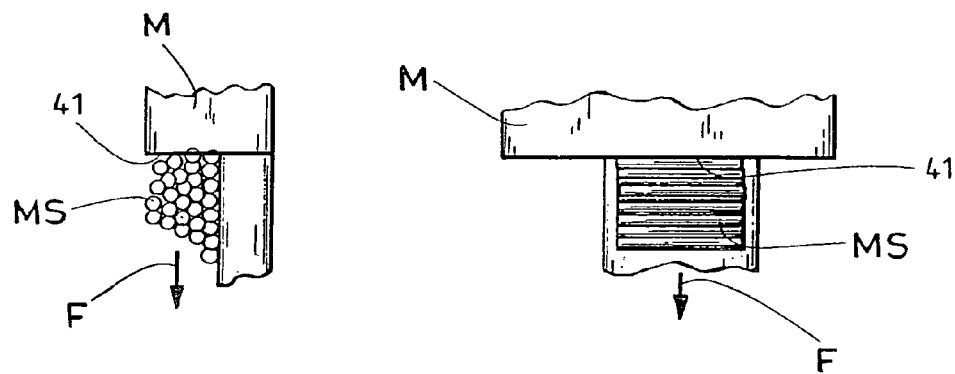
Figure 1A:
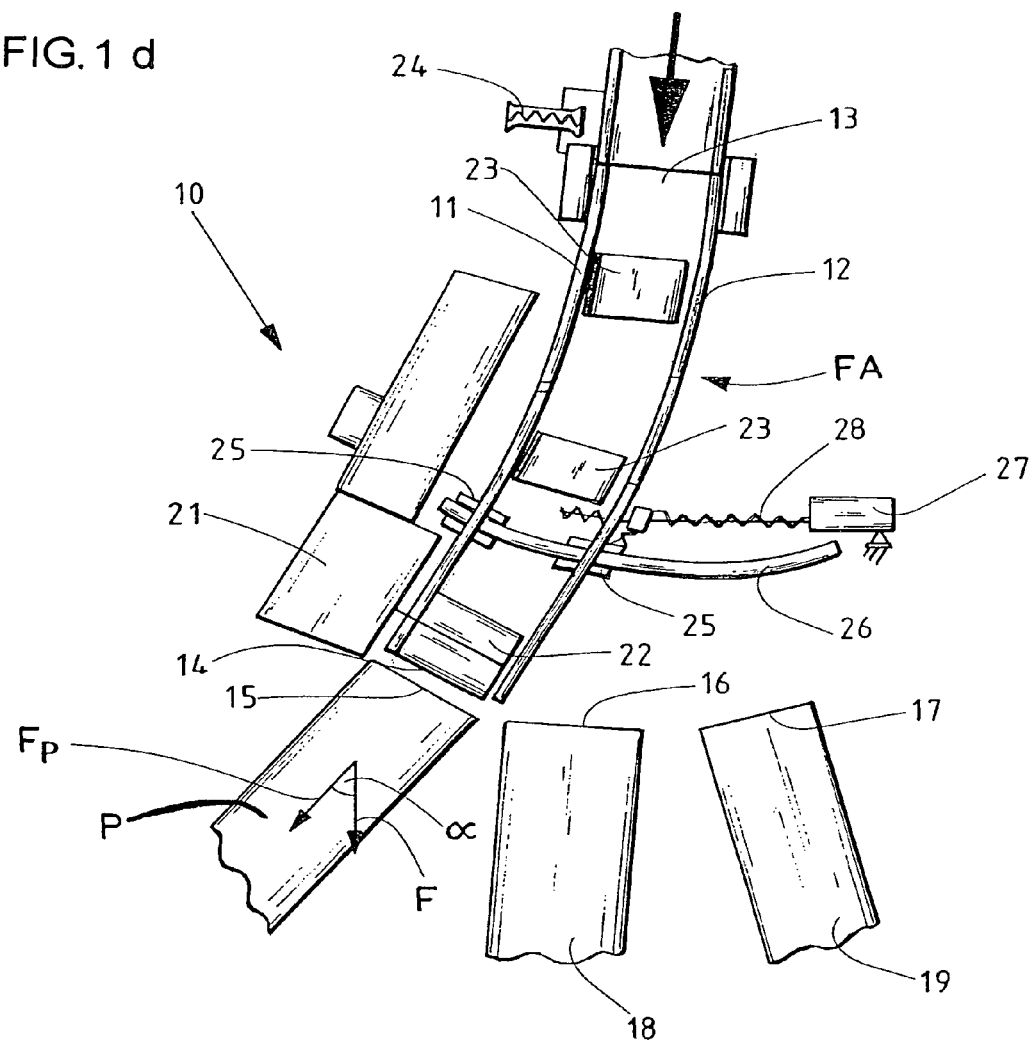
FIG. 1a shows a top view a conveyor section between an outlet of a first machine of the tobacco-processing industry in the transfer area to three inlets of downstream devices of the tobacco-processing industry.

FIG. 1a shows schematically the conveyance of a mass flow MS of a production machine M, which has an outlet 41, via which the mass flow MS is conveyed out of the production machine M. The mass flow MS of rod-shaped articles is indicated schematically in FIG. 1a and includes, for example, completed filter cigarettes or filter rods that are transported next to each other and above each other transaxially. The mass flow MS is conveyed along a conveyor route F, which is indicated schematically with an arrow in FIG. 1a. The conveyor direction is perpendicular or transverse to the longitudinal axis of the articles of the mass flow MS.

FIG. 1d shows a side view of the outlet 41 of the production machine M.

An infeed and transfer device (e.g., a Rod Transfer System (RTS)) or a rod transfer unit can also be provided along the conveyor route F. This type of transfer unit should be understood by those having ordinary skill in the art (see, e.g., German Patent Application No. DE-A-10 2005 018 302, particularly FIG. 1, the disclosure of which is expressly incorporated by reference herein in its entirety) such that further explanation is not believed necessary.

Figure 1B:
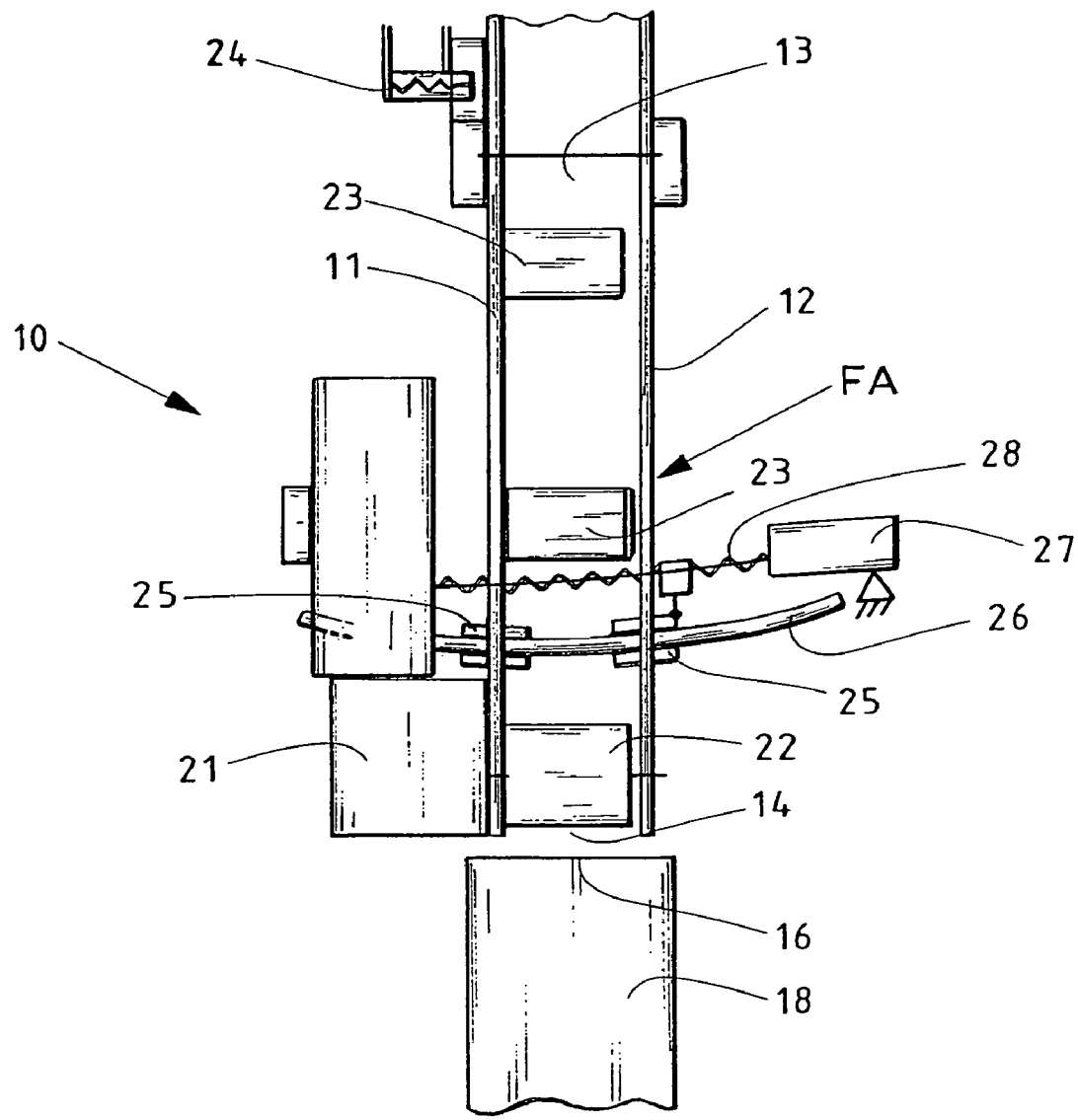
FIG. 1b shows the transfer area of FIG. 1a where a straight-line transfer of the mass flow takes place.
Figure 1C:
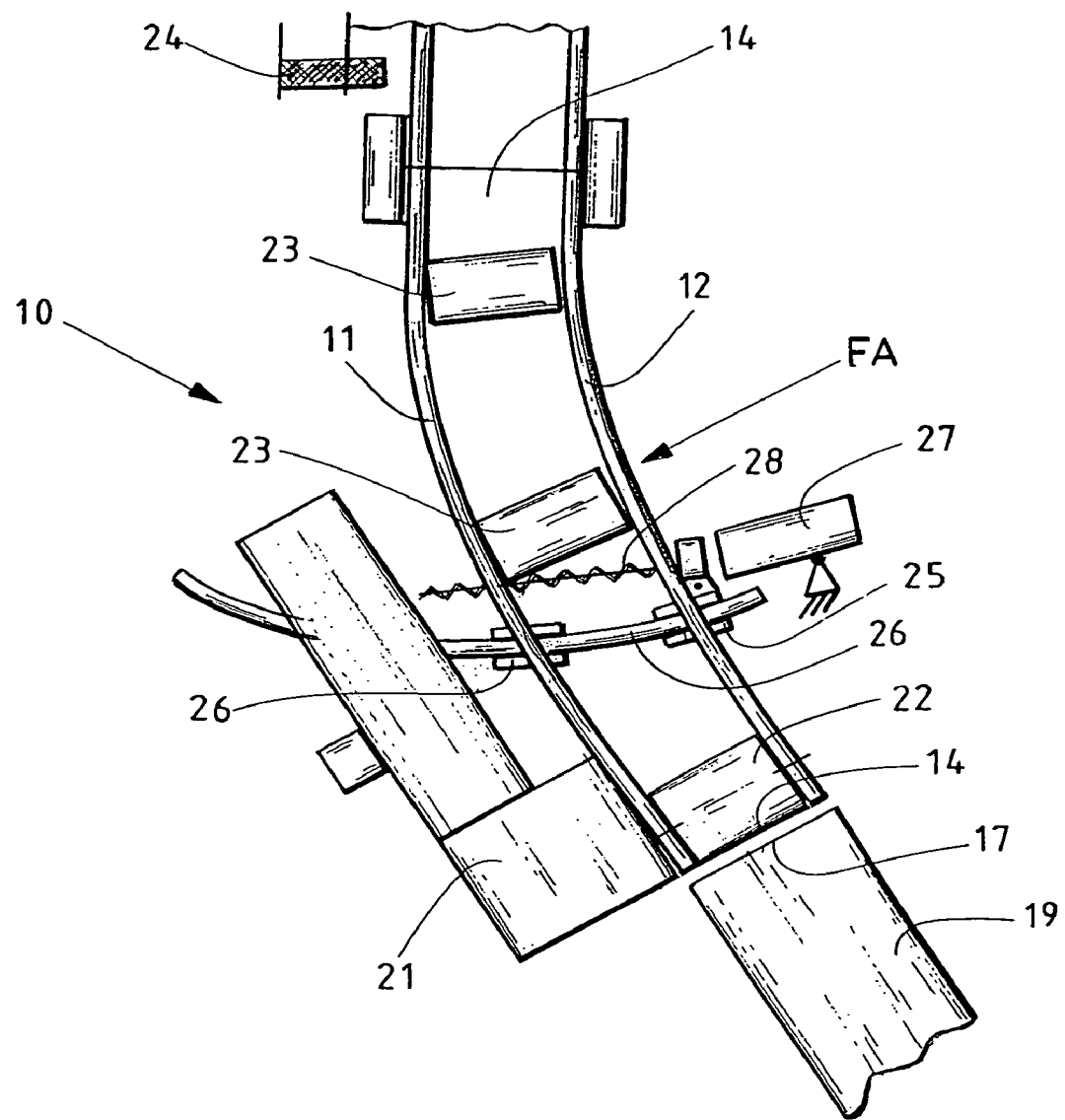
FIG. 1c shows a top view from of the transfer area according to FIG. 1a where the mass flow is moved to the inlet of a third downstream device.

The mass flow MS is guided to a transfer device 10 along the conveyor route F. The transfer device 10 has flexible or bendable guide rails 11, 12, which border a guide section FA. The guide section FA, which is formed by the guide rails 11, 12, has an inlet 13 and an outlet 14. As depicted in FIGS. 1a, 1b, and 1c, the outlet 14 is provided on the end of the guide rails 11, 12 such that the outlet 14, depending on the position of the guide rails 11, 12, can be sent to different inlets 15, 16, 17 of devices P, 18, 19 of the tobacco-processing industry. In FIG. 1a, the outlet 14 of the guide section FA is assigned to the inlet 15 of another machine P of the tobacco-processing industry, such as, for example, a packaging machine.

The conveyor direction $F_P$ of the mass flow conveyed to machine P is diverted with respect to the original direction F at an acute angle α.

Moreover, in embodiments the outlet 14 of the guide section FA is delivered to other inlets 16, 17 of other devices 18, 19 of the tobacco-processing industry by bending the flexible guide rails 11, 12. In FIG. 1a, the other inlets 16, 17, e.g., for a collection reservoir 18 and another collection container 19, are arranged schematically in the pivot area of the outlet 14.

For example, the device 18 may be used to discharge a channel clearing device, such as that described above, in the case of corresponding position of the guide rails 11, 12. The device 19 can be used, for example, to discharge a reject or a batch of rod-like articles and to capture them in a collection container.

In embodiments, the guide rails 11, 12 are permanently arranged on the inlet side (i.e., in the area of the inlet 13), while the outlet 14 of the guide section FA bordered by the guide rails 11, 12 can be assigned or moved to the different inlets 15, 16, 17 depending on the desired or predetermined operation type.

In further embodiments, a drive unit 21 is arranged on the end in the area of the outlet 14 to convey the delivered articles of the mass flow MS in the conveyor section FA, preferably in a horizontal plane. The drive unit 21 drives a corresponding drive roller 22 of a chain conveyor between the guide rails 11, 12 in the area of the outlet 14. For clarity, the chain conveyor is not shown. In implementations of the invention, the chain conveyor, in the area between the inlet 13 and the outlet 14, includes opposite-lying chain members based on the pivotability of the guide rails 11, 12 in order to follow the movements of the guide rails 11, 12.

In even further embodiments, spacers 23 are fastened at predetermined distances along the guide section FA on the guide rails 14 along the conveyor route between the inlet 13 and the outlet 14. When the guide rails 11, 12 are bent the spacers 23 cause the distance between the guide rails 11, 12 to remain almost constant over the entire length between the inlet 13 and the outlet 14. In this manner, the articles of the mass flow MS that are guided through are not mechanically stressed, i.e., pushed together or the like. The spacers 23 are only fastened on one side, e.g., on the guide rail 11, while they have no permanent contact with the other side, e.g., the opposite guide rail 12.

According to aspects of the invention, the width of the spacers 23 is smaller than the distance between the parallel guide rails 11, 12, e.g., during straight-line conveyance of the article of the mass flow without diversion of the mass flow. This is depicted in FIG. 1b, where the guide rails 11, 12 are arranged parallel with respect to each other.

A sensor 24 may be arranged laterally on the inlet side of the guide section FA, with which holes in the mass flow or a channel clearing device are detected.

In embodiments, in order to shift the guide rails 11, 12, corresponding guide members 25 are arranged on the bottom side of the guide rails 11, 12. The guide members 25 are in contact with a guide support 26, so that the guide rails 11, 12 on the bent guide support 26 are correspondingly moved in the case of a pivoting. An adjustment unit 27 is arranged laterally in the area of the guide support 26. The adjustment unit 27 is connected via a corresponding drive spindle 28 with the guide rail 12 so that the guide rails 11, 12 are moved from their position by turning the drive spindle 28 so that the outlet of the guide section FA is delivered to another inlet 15, 16, or 17 of a downstream device P, 18, or 19.

In further embodiments, movement of the guide rails 11, 12 preferably takes place when the mass flow is stopped, i.e., when the guide section FA between the inlet 13 and the outlet 14 is empty. The guide section FA may be emptied with a channel clearing device, as described above.

Using the transfer device 10 according to aspects of the invention, the conveyor route F may be coupled with different functional units or devices in a simple manner.

Accordingly, a diversion to the inlets 15, 16, 17 of the three devices P, 18, 19 takes place in a gentle manner. By using the transfer device 10, it is possible to discharge defective mass flow batches from the production process, so that the defective batches are not delivered to a further processing machine (e.g., packaging machine P).

In implementations of the invention, a defective batch with rod-shaped articles of the tobacco-processing industry can be conveyed, for example, to the collection container 19 by adjusting or moving the outlet 14 of the moveable guide section FA (see FIG. 1*c*).

By using the transfer device 10 according to aspects of the invention, a type of mass flow director is provided in which the diversion of the mass flows with rod-shaped articles takes place on a transport level in a manner that is gentle on the products. The reorientation or diversion of the mass flow MS in a corresponding inlet of a downstream device of the tobacco-processing industry takes place in a small pivot area of the outlet 14, where the bending radiuses of the guide rails 11, 12 are very large. In embodiments, the bending radiuses of the guide rails 11, 12 are in the range of 5 m to 30 m.

FIG. 1*b* shows the transfer device 10, in which the guide rails 11, 12 are arranged parallel to each other so that a straight-line transport takes place between the inlet 13 and the outlet 14 to the inlet 16 of the downstream device 18.

Moreover, FIG. 1*c* shows a third position of the transfer unit, in which the outlet 14 of the transfer device 10 is delivered to the inlet 17 of the device 19, e.g. to a collection container.

In implementations of the invention, a faster brand change from a first brand to a second brand can take place using the transfer device 10 when a corresponding separating body or spatial body is located between the mass flow batches. The article batch approaching the spatial body can be conveyed, for example, to the packaging machine P. After detection of the separation or spatial body by the sensor 24, a position change in the guide rails 11, 12 conveys the spatial bodies to the collection contain or the device 18. Then the second mass flow batch is conveyed to the inlet 17 (see FIG. 1*c*) of another device, e.g. a packaging machine.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

10 Transfer device
11, 12 Guide rail
13 Inlet
14 Outlet
15 Inlet
16 Inlet
17 Inlet
18 Device
19 Device
21 Drive unit
22 Drive roller
23 Spacer
24 Sensor
25 Guide members
26 Guide support
27 Adjustment unit
28 Drive spindle
41 Outlet
F Conveyor route
$F_P$ Conveyor direction
M Production machine
MS Mass flow
P Packaging machine
FA Conveyor section
α Angle

What is claimed:

1. An apparatus structured and arranged to transport rod-shaped articles of the tobacco-processing industry in a mass flow between an outlet of a first machine and inlets of a plurality of second machines, comprising:
    guide rails having an inlet side in fixed relation to the outlet of the first machine and a moveable outlet side;
    spacers provided between the guide rails,
    wherein the spacers are fixed to only one of the guide rails.

2. The apparatus of claim 1, wherein the spacers are arranged transverse to a direction of the mass flow at a predetermined distance from each other, to maintain a predetermined distance between the guide rails.

3. The apparatus of claim 1, wherein:
    the first machine comprises a production machine,
    the plurality of second machines comprises at least one of a packaging machine, a collection machine, and a collection container, and
    the guide rails form an adjustable branching unit along a conveyor route of the mass flow, the conveyor route extending between the outlet of the first machine and, depending upon a position of the adjustable branching unit, one of the inlets of the plurality of second machines.

4. The apparatus of claim 3, wherein the guide rails are arranged laterally to the conveyor route of the mass flow.

5. The apparatus of claim 1, further comprising a drive at the outlet side structured and arranged to bend the guide rails into alignment with one of the inlets of the plurality of second machines.

6. The apparatus of claim 1, further comprising a sensor unit at the inlet side.

7. The apparatus of claim 1, further comprising at least one conveyor device in a conveyor section between the inlet side and the outlet side of the guide rails.

8. The apparatus of claim 7, wherein the at least one conveyor device comprises a chain conveyor.

9. The apparatus of claim 8, further comprising a drive device that drives the at least one conveyor device.

10. The apparatus of claim 9, wherein the drive device is at the outlet side of the guide rails.

11. The apparatus of claim 1, further comprising a guide support at the outlet side of the guide rails.

12. The apparatus of claim 11, wherein the guide support guides movement of the outlet side of the guide rails transverse to a direction of the mass flow.

13. The apparatus of claim 1, wherein the outlet side of the guide rails is deflectable at an angle between 0° and 45° with respect to a direction of the mass flow at the inlet side of the guide rails.

14. The apparatus of claim 1, wherein the outlet side of the guide rails is deflectable at an angle between 0° and 30° with respect to a direction of the mass flow at the inlet side of the guide rails.

15. The apparatus of claim 1, wherein a conveyance of the mass flow in an area of the guide rails takes place in a plane.

16. The apparatus of claim 15, wherein the plane is a horizontal plane.

17. The apparatus of claim 1, wherein the outlet side of the guide rails is moved from a first one of the inlets of the plurality of second machines to a second one of the inlets of the plurality of second machines without the rod-shaped articles between the guide rails.

18. A method for transporting rod-shaped articles of the tobacco-processing industry in a mass flow from an outlet of an upstream machine, comprising:

diverting the mass flow by bending guide rails from a first position aligned with a first inlet of a first downstream machine to a second position aligned with a second inlet of a second downstream machine, wherein spacers are provided between the guide rails, and the spacers are fixed to only one of the guide rails.

19. A system for transporting rod-shaped articles of the tobacco-processing industry in a mass flow from an outlet of an upstream machine, comprising:

flexible guide rails structured and arranged to divert the mass flow by bending from a first position aligned with a first inlet of a first downstream machine to a second position aligned with a second inlet of a second downstream machine; and spacers located between the guide rails, wherein the spacers are fixed to only one of the guide rails.

* * * * *